United States Patent [19]
Martin et al.

[11] 3,940,461
[45] Feb. 24, 1976

[54] LIQUID AERATION METHOD AND PUMP APPARATUS WITH STATIONARY VANES AND DOWNWARD FLOW

[75] Inventors: Ernest J. Martin, Rolling Meadows; Arvid A. Molitor, Elgin, both of Ill.

[73] Assignee: Ernest J. Martin, Rolling Meadows, Ill.

[22] Filed: Feb. 15, 1974

[21] Appl. No.: 442,836

[52] U.S. Cl. .................................. 261/91; 261/120
[51] Int. Cl.² ............................................... B01F 3/04
[58] Field of Search ............ 261/87, 91, 120; 415/7, 415/216-218

[56] References Cited
UNITED STATES PATENTS

| | | | |
|---|---|---|---|
| 2,072,944 | 3/1937 | Durdin, 3rd | 261/91 X |
| 2,966,345 | 12/1960 | Burgoon et al. | 261/87 |
| 3,101,173 | 8/1963 | Jennings | 261/91 X |
| 3,253,821 | 5/1966 | Jamison | 261/91 X |
| 3,479,017 | 11/1969 | Thikotter | 261/91 |
| 3,497,185 | 2/1970 | Dively | 261/91 X |
| 3,559,964 | 2/1971 | Sell et al. | 261/91 |
| 3,584,840 | 6/1971 | Fuchs | 261/87 X |
| 3,643,403 | 2/1972 | Speece | 261/91 X |
| 3,669,422 | 6/1972 | Nogaj | 261/91 X |
| 3,814,395 | 6/1974 | Kaelin | 261/91 X |
| 3,846,516 | 11/1974 | Carlson | 261/87 |

Primary Examiner—Tim R. Miles
Assistant Examiner—Richard L. Chiesa
Attorney, Agent, or Firm—Darbo, Robertson & Vandenburgh

[57] ABSTRACT

Between the vertical tube walls and the blades of the rotating impeller are four vanes attached to the tube walls. In the area radially about the impeller, the vanes are pitched in a direction opposite to the pitch of the impeller blades. The impeller is rotated in a direction such as to force the water downwardly. The top of the tube is below the normal surface of the water and the vanes are inclined from the top to the bottom of the tube. The impeller is rotated at a speed sufficient to produce a vortex from the top of the tube to approximately the top of the impeller.

8 Claims, 2 Drawing Figures

LIQUID AERATION METHOD AND PUMP APPARATUS WITH STATIONARY VANES AND DOWNWARD FLOW

RELATED APPLICATION

The present invention is an improvement on the invention disclosed and claimed in an application of Ernest J. Martin entitled Liquid Pump With Stationary Vanes, Ser. No. 442,840, filed concurrently herewith, the disclosure of which is incorporated herein by reference.

BACKGROUND AND SUMMARY OF THE INVENTION

For cooling and/or aerating bodies of water a number of different types of pumps or spray devices have been devised. These are very often supported at the surface of the body of water by a suitable float arrangement. The prior art devices have employed a vertical tube or housing in which there is an impeller positioned below the surface of the water and rotating about the axis of the tube to force the water out of the top of the tube. In many embodiments the motor was positioned above the top of the tube concentric with the tube axis so that the motor shaft extended vertically down to the impeller. Since the water would exit vertically upward from the top of the tube it would be directed at the motor. This would tend to cause problems such as getting into the motor bearings. This fact plus the desire to spread the water out in a large circular pattern for maximum effect, resulted in the use of various forms of deflectors, etc., so as to cause the water exiting vertically from the top of the tube to turn out horizontally into the desired pattern. Such devices are complicated in the sense that they require additional manufacturing and thus increase the cost. They tend to decrease efficiency by introducing friction, and sometimes static pressure, into the system. These problems are avoided when the present invention is employed, by reason of the fact that the water flow is downward.

The present invention is employed where the requirement is primarily or solely, one of aeration and not cooling. The top of the tube is positioned a short distance below the normal surface level of the water. The impeller is substantially below the top of the tube. Vanes, secured to the tube and positioned about the impeller, are inclined downwardly from the top to the bottom of the tube. The vanes are inclined in the direction opposite to the inclination of the blades on the impeller. The impeller is driven sufficiently fast that a vortex is created from the normal water surface to the top of the impeller. The result is that air is drawn down to the impeller through the center of this vortex. That air is mixed with the water at the impeller and the air and water mixture then is driven down and exits from the pump at a level substantially below the normal water surface.

Embodiments of the type just described have a number of advantages in addition to the increased efficiency obtained by reason of the use of the vanes. These advantages include the following: it takes less energy to force the water downwardly than it does to pump it up in the air and throw it out about the top of the pump, i.e., the apparatus is not moving the water against the pull of gravity. There is not the water loss from evaporation that occurs when the device produces a water spray in the air. In spray type devices it has been the theory that a spray consisting of relatively small droplets is necessary in order to best achieve aeration, but just such a spray also will result in the greatest evaporation. Furthermore, just such a spray is most likely to drift with the wind and, in particular applications, will cause an objectionable mist or water deposit in adjacent areas. In most instances, the surface water is warmer than the temperature of the water at lower levels. Thus, the surface water is least able to hold air. By injecting the air into the cooler areas of the pond, the greater is the likelihood of retention. Furthermore, by injecting the air substantially below the water surface the air must flow up through the higher layers of water before it reaches the surface to be dissipated and during that upward flow it is likely to be picked up and retained by the upper layers of water. Additionally, the prior art devices which deposited the water having the highest air content at the surface of the pond created a disturbance at the surface of the pond, which disturbance was conducive to the loss of air. Such a situation does not, of course, occur in the embodiment described in which the water with the high air content is substantially below the normal water surface when it is released from the pump.

Further objects and advantages will become apparent from the following description.

DESCRIPTION OF SPECIFIC EMBODIMENTS

Figure 1:
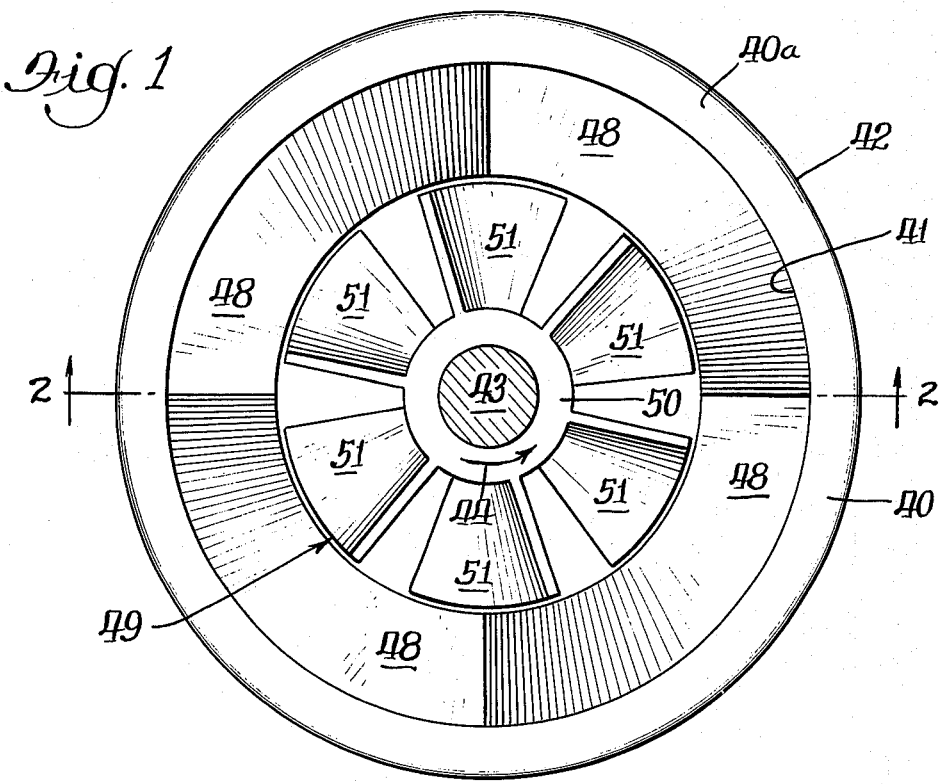
FIG. 1 is a plan view of the "pump" component of an embodiment of the invention.
Figure 2:
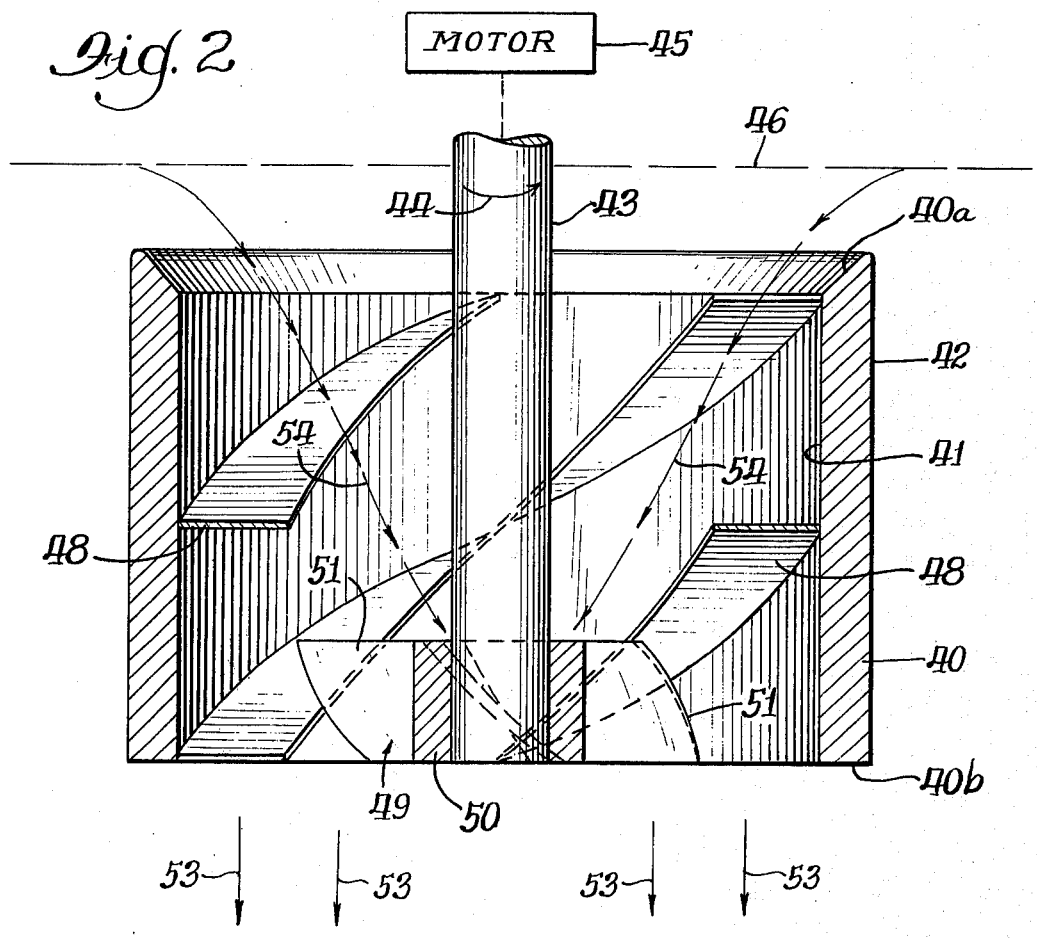
FIG. 2 is a section as seen at line 2—2 of FIG. 1.

The following disclosure is offered for public dissemination in return for the grant of a patent. Although it is detailed to ensure adequacy and aid understanding, this is not intended to prejudice that purpose of a patent which is to cover each new inventive concept therein no matter how others may later disguise it by variations in form or additions or further improvements.

In the described embodiment, the pumping movement of the water is down rather than up as in the prior art devices of which we are aware. There is a tube 40 having inner walls 41 and outer walls 42. It has its axis aligned vertically and coincident with the axis of shaft 43. The shaft is rotated by motor 45 in the direction indicated by arrow 44. Suitable means, not shown, are provided to support tube 40 so that its top 40a is a short distance, e.g. an inch, below the normal surface level of the water, the normal surface level being indicated by dashed line 46. This may be a float or may take the form of a fixed mount.

Within the tube 40 are four vanes 48, each of which extends from the top 40a to the bottom 40b of the tube. As viewed from above, the vanes rotate 180° from top to bottom. The vanes are secured to the tube.

Secured to the bottom of shaft 43 is an impeller, generally 49. This impeller comprises a hub 50 having 60 blades 51 extending therefrom.

In the described embodiment the radius of the periphery of the impeller is approximately 60% of the radius of the inner wall. The internal radius of these reaction vanes is only slightly greater than the external radius of the impeller. Thus the inner edges of the vanes define a cylindrical opening within which is the impeller. In addition, these reaction vanes are pitched in a direction opposite to the pitch of the blades of the impeller.

When the impeller 49 is rotated in a counterclockwise direction (as viewed from above), illustrated in the drawings by arrow 44, the blades of the impeller 49 force the water vertically downwardly in the tube. The rotation of the impeller also imparts a rotational movement, i.e. rotational about the axis of shaft 43, to the water. The portion of the vanes 48 that is radially opposite the impeller 49 serves as the reaction vane so as to produce a force on this rotating water column in a direction such as to move the water vertically downward, i.e. the direction indicated by arrows 53. That part of the vanes 48 which lies above the top of the impeller serves to guide the water descending into the impeller.

With respect to the various parameters of a particular device, e.g., the size of a particular impeller 49, etc., a motor 45 should supply sufficient power so that a vortex is created which extend substantially down to the top of the impeller. Such a vortex is illustrated by the dashed lines 54. This will be approximately in the shape of an inverted cone in which there is nothing but air from the normal surface level 46 to approximately the top of the impeller. In a particular embodiment, this vortex may not occur immediately upon the starting of motor 45, but the motor should supply sufficient power so that within a short time the vortex will result.

The air drawn down into the vortex is sucked into the impeller 49 and there mixed with the descending water. The mixture of air and water is ejected from the bottom 40b of the tube. In some embodiments in which it is desired to carry the air down close to the lower layers of a relatively deep pond, the tube 40 may be extended downwardly for a substantial distance below that illustrated. That descending portion of the tube can be a reduced diameter over the diameter of tube 40. For most installations, however, such an extension would be undesirable because it just introduces additional friction into the system.

An embodiment of the described invention was built using a (1/23) horse power D.C. motor operated from a twelve volt battery. The blades 51 and the vanes 48 had an 8 pitch. The impeller had a diameter of about three and one-half inches and a height of one inch. The diameter of the inner wall 41 was approximately 5 5/8 inches. This particular embodiment provides effective aeration even when the voltage supplied to the D.C. motor varies as much as the range 15 to 10.8 volts. This is important because even a fairly well charged 12 volt battery can drop to the lower end and, when the alternator is running, the voltage can go to the upper end. The pitch, sizes of parts, depth of components below the water surface, etc., obviously can be changed to meet the requirements of a particular application. The pitch of the impeller and that of the vanes need not necessarily be identical.

Because of the high efficiency of a pump of the character described using reaction blades, they are particularly suited for applications in which the power supply is limited. For example, in a tank truck or railroad tanker used to transport live fish, the available power may not be very great. It is likely to be limited to batteries, with or without an alternator which is driven by the motor or wheels. While the described embodiment would probably provide considerable more aeration than would be required for a tank truck or railway tanker, even smaller motors can be effectively employed for small tanks.

The rotation of the impeller should be counterclockwise as indicated by arrow 44. Thus, the rotation of the earth aids, and does not hinder, the forming of the counterclockwise rotating vortex defined by lines 54 on the drawing. For embodiments used in the Southern Hemisphere, a clockwise rotation would be employed for the same reason.

We claim:

1. In a pump for use in aerating or cooling a body of liquid such as water having a normal surface level, said pump being of the type having rotationally stationary tube means about a vertical axis, a device connected to the tube means to support the tube means in the liquid with the bottom of the tube means below the normal surface level, power drive means, impeller means connected to said drive means and positioned below said normal surface level, said impeller means having blades pitched in a predetermined direction, and vane means within said tube means and affixed thereto, at least part of said vane means being pitched in the opposite of said predetermined direction, said vane means defining a central opening, said impeller means being positioned within said central opening, the improvement comprising:
   the tube means having a top below said normal surface level, and
   said power drive means rotating said impeller means in a direction such as to force the liquid downwardly in the tube means.

2. In a pump as set forth in claim 1, wherein said part of said vane means is spaced from the top of the tube means, said vane means including a second part extending upwardly from the first mentioned part, said second part also being inclined downwardly in approximately the same direction as the first mentioned part.

3. In a pump as set forth in claim 2, wherein said tube means is cylindrical about said axis, and said vane means comprises a plurality of vanes regularly spaced about said axis.

4. In a pump as set forth in claim 3, wherein said impeller means has a diameter about said axis which is approximately sixty percent of the internal diameter of the tube means, said vane means extending closely adjacent the impeller means.

5. In a pump for aerating a body of liquid such as water having a normal surface level, said pump being of the type having rotationally stationary tube means about a vertical axis, a device connected to the tube means to support it in the liquid with the bottom of the tube means below the normal surface level, power drive means, and impeller means connected to the power drive means and positioned below the normal surface level, said impeller means being rotated by the power drive means to move the liquid axially in the tube means, the improvement comprising:
   the top of said tube means being below said normal surface level a given distance,
   the top of said impeller means being below the top of the tube means,
   said power means rotating said impeller means in a direction such that the axial movement of the liquid is downwardly with the impeller means rotating at sufficient speed that a vortex extends from said normal surface level approximately to the top of said impeller means, and
   including vane means within said tube means and affixed thereto, part of said vane means being radially adjacent the impeller means and being pitched in a direction opposite to the pitch of the blades on the impeller means.

6. In a pump as set forth in claim 5, wherein said vane means extends above said impeller means and there is also pitched in the direction opposite to the pitch of the blades.

7. In a pump as set forth in claim 6, wherein said impeller means rotates in a counterclockwise direction as viewed from above, said vane means being in the form of a helix which descends in a counterclockwise direction as viewed from above.

8. In a pump as set forth in claim 5, wherein the power drive means rotates the impeller in a counterclockwise direction for pumps used in the Northern Hemisphere and clockwise for pumps used in the Southern Hemisphere.

* * * * *

UNITED STATES PATENT OFFICE
CERTIFICATE OF CORRECTION

PATENT NO. : 3,940,461
DATED : February 24, 1976
INVENTOR(S) : Ernest J. Martin and Arvid A. Molitor It is certified that error appears in the above-identified patent and that said Letters Patent are hereby corrected as shown below:

Column 2, line 60, "60" should read --6--.

Column 3, line 19, "extend" should read --extends--.

Signed and Sealed this twenty-second Day of June 1976

[SEAL]

Attest:

RUTH C. MASON
Attesting Officer

C. MARSHALL DANN
Commissioner of Patents and Trademarks